United States Patent
Saito

(10) Patent No.: US 8,009,616 B2
(45) Date of Patent: Aug. 30, 2011

(54) RADIO ACCESS METHOD, RADIO BASE STATION AND RADIO TERMINAL

(75) Inventor: Naoyuki Saito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 936 days.

(21) Appl. No.: 11/987,853

(22) Filed: Dec. 5, 2007

(65) Prior Publication Data
US 2008/0125155 A1 May 29, 2008

Related U.S. Application Data

(63) Continuation of application No. PCT/JP2005/011161, filed on Jun. 17, 2005.

(51) Int. Cl.
*H04W 4/00* (2009.01)
(52) U.S. Cl. ........ 370/328; 370/331; 370/339; 455/436; 455/456.1
(58) Field of Classification Search .................. 370/328, 370/329, 331, 332, 334, 339; 455/436, 437, 455/439, 440, 441, 456.1
See application file for complete search history.

(56) References Cited

U.S. PATENT DOCUMENTS

| | | | | |
|---|---|---|---|---|
| 6,351,498 | B1 * | 2/2002 | Yamao et al. | 375/260 |
| 2006/0072501 | A1 * | 4/2006 | Toshimitsu et al. | 370/328 |
| 2008/0285534 | A1 * | 11/2008 | Dent | 370/342 |
| 2010/0069032 | A1 * | 3/2010 | Kent et al. | 455/276.1 |

FOREIGN PATENT DOCUMENTS

| | | |
|---|---|---|
| EP | 1 376 895 A2 | 1/2004 |
| JP | 2004529524 | 9/2004 |
| JP | 2004-297750 | 10/2004 |
| WO | 0249385 A2 | 6/2002 |
| WO | WO 03/094550 A1 | 11/2003 |

OTHER PUBLICATIONS

Notice of Reason for Rejection dated Aug. 10, 2010 in corresponding Japanese Patent Application No. 2007-521052.

* cited by examiner

*Primary Examiner* — Huy Vu
*Assistant Examiner* — Dady Chery
(74) *Attorney, Agent, or Firm* — Fujitsu Patent Center

(57) ABSTRACT

A radio terminal receives a directional multibeam from a radio base station and obtains each of correlation between orthogonal code series of the received directional multibeam and its own orthogonal code series to determine an orthogonal code series having the highest autocorrelation and further advertises orthogonal code series identification information identifying this orthogonal code series to the radio base station through an uplink physical channel. In comparison with a previous technique, this can shorten the time to be taken until the radio base station recognizes an orthogonal code series having the highest autocorrelation and a satisfactory reception condition in the radio terminal. Thus, it is possible to increase the speed of the loop control between the radio base station and the radio terminal, thereby improving the throughput of a channel to be used for the transmission of user data.

15 Claims, 7 Drawing Sheets

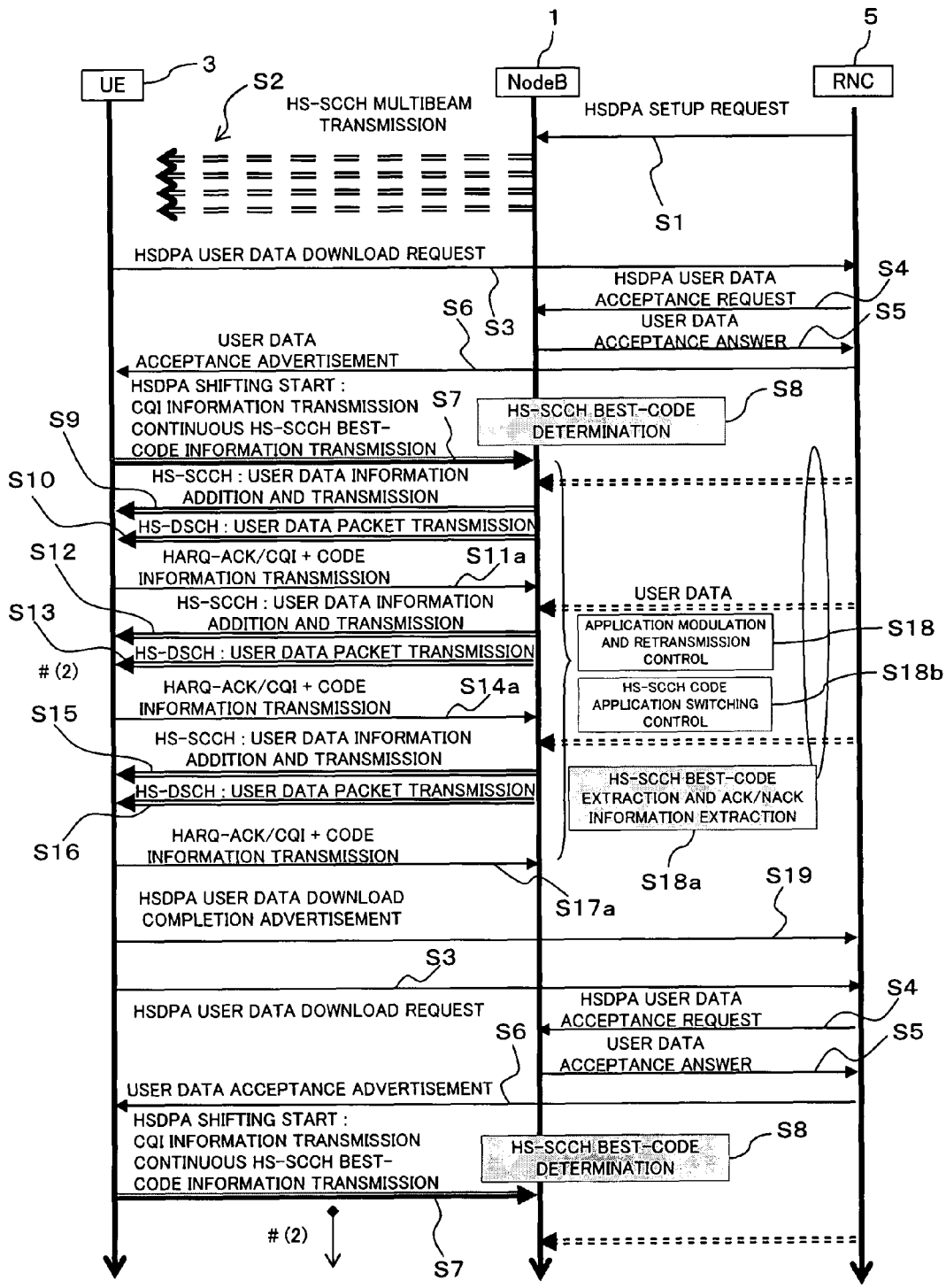

RADIO ACCESS METHOD, RADIO BASE STATION AND RADIO TERMINAL

CROSS-REFERENCE TO RELATED APPLICATIONS

This is a continuation application of International Application Number PCT/JP2005/011161, which was filed on Jun. 17, 2005.

TECHNICAL FIELD

The present invention relates to a radio access method, radio base station and radio terminal, and it relates to a technique suitable for use in mobile radio communication such as HSDPA (High Speed Downlink Packet Access), specifically, for use in a radio system including a radio base station, such as an adaptive array antenna or multibeam antenna, capable of transmitting directional multibeam.

BACKGROUND ART

Presently, in the 3GPP (3rd Generation Partnership Project), the standardization is advancing with respect to a W-CDMA (Wideband-Code Division Multiple Access) system which is one of third-generation mobile communication systems. Moreover, as one of themes of the standardization, there is specified an HSDPA system which provides a large-amount and high-speed packet data transfer (up to approximately 14 Mbps) in a down direction (downlink).

The HSDPA employs an adaptive coding and modulation technique and has one feature that the switching between a QPSK (Quadrature Phase Shift Keying) modulation technique and a 16 QAM (Quadrature Amplitude Modulation) technique is made in accordance with radio environment between a base station and a mobile station. Moreover, the HSDPA employs an HARQ (Hybrid Automatic Repeat request) technique. That is, the HSDPA features that, when a mobile station has detected an error with respect to received data from a base station, the data is retransmitted from the base station in response to a request from the mobile station and the mobile station carries out the error correction decoding by use of both the previously received data and the retransmitted received data. Thus, the HARQ utilizes the previously received data effectively even if an error exists, thereby enhancing the error correction decoding gain and suppressing an increase in the number of times of retransmission.

Among the principal radio channels for use in the HSDPA, there are HS-SCCH (High Speed-Shared Control Channel), HS-PDSCH (High Speed-Physical Downlink Shared Channel) and HS-DPCCH (High Speed-Dedicated Physical Control Channel).

Both the HS-SCCH and HS-PDSCH are a common channel in a down direction (that is, direction from a base station to a mobile station), and the HS-SCCH is a control channel for transmitting various types of parameters on data through the HS-PDSCH. For example, the parameters include information such as modulation type information indicative of which of modulation techniques is used for transmitting data through the HS-PDSCH, the number of spread codes to be allocated and a pattern of rate matching to be made with respect to transmission data.

On the other hand, the HS-DPCCH is an individual control channel in an up direction which is a direction from a mobile station to a base station, and it is used in a case in which the mobile station transmits an ACK signal or NACK signal to the base station in accordance with the reception result of data received through the HS-PDSCH. If the mobile station has failed to receive the data (a case in which a CRC error occurs in the received data, or in other cases), the NACK signal is transmitted from the mobile station, and the mobile station executes the retransmission control).

In addition, the HS-DPCCH is also used when a mobile station which has measured a reception quality [for example, SIR (Signal-to-Interference Ratio)] of a received signal from a base station transmits the measurement result as CQI (Channel Quality Indicator) to the base station. The base station, based on the received CQI, determines the quality of the radio environment in the downlink. If the result of the determination indicates a satisfactory radio environment, the base station conducts the switching to a modulation technique which enables the transmission of data at a higher speed, while conversely, if the result of the determination does not indicate a satisfactory radio environment, the base station carries out the switching adaptively to a modulation technique which transmits the data at a lower speed.

Meanwhile, in the HSDPA technique, a large number of unspecified users share a limited HSDPA dedicated channel, and there is a need to control the power distribution between the shared channel and individual channels for each user.

In this case, the high-speed packet data communication quality (throughput) of the HSDPA depends upon the HSDPA transmission electric energy, the retransmission control, the adaptive modulation allocation and others. Of these, an important object in the improvement of the throughput is the transmission power which the HSDPA occupies. Moreover, although a plurality of users are accessible at the same time, an increase in the number of users causes a decrease in the power to be allocated to each user, which leads to a reduction of the throughput.

In the recent years, the interference suppression effect is expectable by forming a directional beam by use of an adaptive array antenna technology or the like, which enables the enhancement of the cell capacity or the reduction of the transmission power needed for assuring a given communication quality. The adaptive array antenna is a technique capable of increasing the channel capacity, and it can form a beam adaptively to an intending user and can set a null with respect to a user who becomes a large interference source.

That is, by forming a beam in a direction toward the target user and directing a null in a direction of the user who becomes a large interference source, it is possible to receive a radio signal with high sensitivity from the target user and avoid the reception of a radio signal from the large interference source. This can reduce the degree of interference, which leads to increasing the channel capacity.

Although the improvement of the throughput is expectable by applying this technique to the HSDPA, there are the following problems.

That is, since the HS-SCCH is a control channel shared by a plurality of users, it is difficult to form a directional antenna beam for each individual user. For this reason, in the HS-SCCH, there is a need to make the directional beam constant. For example, the following Patent Document 1 proposes that a different HS-SCCH code is allocated arbitrarily to each beam.

Patent Document 1: Japanese Patent Laid-Open No. 2004-297750

DISCLOSURE OF THE INVENTION

Problems to be Solved by the Invention

However, in this case, the reception sensitivity varies according to the position of the user terminal.

Moreover, according to the technique disclosed in the Patent Document 1, an antenna beam to be used for the transmission on a radio base station side becomes controllable so as to always maintain a satisfactory reception condition in a terminal station in a manner such that a pilot symbol (known signal) of each antenna beam is detected on a terminal station side to estimate a reception SIR for selecting an antenna beam with the highest SIR and the information (beam number) thereon is transmitted (feedbacked) to a radio base station in the uplink (for example, see the paragraphs 0014, 0025 to 0030 and others in the Patent Document 1).

In this case, although the aforesaid feedback information (beam number) to the radio base station is inserted into the uplink signal, concretely, inserted into an information symbol of an dedicated traffic channel (DTCH), since the information symbol can be regenerated only by receiving a plurality of radio frames and carrying out the demodulation and decoding processing for the radio frames, it is difficult to execute the high-speed loop control between a radio base station and a terminal station. For example, in an individual physical channel of the uplink, 15 slots constitute a single radio frame (10 ms) and because of the necessity to carry out the demodulation and decoding processing with respect to at least two radio frames for the regeneration of the information symbol, the recognition of the aforesaid beam number in the radio base station needs at least time of 20 ms.

In the HSDPA, the frame head of a downlink common physical channel (HS-PDSCH) delays by a quantity corresponding to two slots with respect to a common control channel (HS-SCCH). This is for, after a mobile station receives modulation type information through the HS-SCCH, enabling the demodulation of the HS-PDSCH according to a modulation method corresponding to the received modulation type. Thus, if a delay is encountered with respect to the aforesaid loop control, the interference suppression effect is not sufficiently attainable in the practical use, which degrades the communication quality of the downlink (common control channel), thereby resulting in a decrease in throughput of the downlink common physical channel.

With the foregoing problems in view, one object of the present invention is to increase, in a radio system in which directional multi-beam is transmitted in a state where a different orthogonal code series is allocated to each of a plurality of directional beams, the speed of the loop control using a physical channel between a radio base station and a ratio terminal, thereby improving the communication quality of a down physical channel (common control channel) and consequently improving the throughput of a downlink physical channel (common physical channel).

Means for Solving the Problems

In order to accomplish the above objects, according to the present invention, the following radio access method, radio base station and radio terminal are provided.

(1) As a generic feature, the present radio access method for use in a radio system including a radio terminal and a radio base station having an array antenna with a plurality of antenna elements and capable of transmitting directional multibeam from the array antenna of the radio base station to the radio terminal in a state where a different orthogonal code series is allocated to each of a plurality of directional beams, the method comprising the steps of: on the radio base station, transmitting a directional multibeam of a downlink physical channel to the radio terminal, on the radio terminal, receiving the directional multibeam from the radio base station; obtaining correlation between the orthogonal code series of the received directional multibeam and an orthogonal code series stored in the radio terminal; determining an orthogonal code series having a highest correlation; and transmitting orthogonal code series identification information identifying the determined orthogonal code series to the radio base station through an uplink physical channel.

(2) As a preferred feature, the radio base station may transmit a directional multibeam through an HS-SCCH (High Speed-Shared Control Channel) of an HSDPA (High Speed Downlink Packet Access) system as the downlink physical channel, and the radio terminal may transmit the orthogonal code series identification information to the radio base station through an HS-DPCCH (High Speed-Dedicated Physical Control Channel) of the HSDPA system as the uplink physical channel.

(3) As another preferred feature, the radio terminal may transmit the orthogonal code series identification information to the radio base station at a transmission timing of an HARQ (Hybrid Automatic Repeat reQuest)-ACK symbol provided in the HS-DPCCH.

(4) As yet another preferred feature, the radio terminal may transmit the orthogonal code series identification information to the radio base station in a state superimposed on the HARQ-ACK symbol.

(5) As a further preferred feature, the radio base station may determine an orthogonal code series for the downlink physical channel to the radio terminal apparatus based on the orthogonal code series identification information received from the radio terminal.

(6) As a still further preferred feature, the same orthogonal code series may be shared between the radio base station and a plurality of radio terminals and a plurality of orthogonal code series to be transmitted through a plurality of directional beams at the same time are identified by the individual directional beams.

(7) Still moreover, it is also possible that, with respect to directional multibeam to be transmitted from the radio base station or another radio base station, different orthogonal code series are allocated among directional beams adjacent to each other.

(8) Yet moreover, preferably, the radio base station may allocate a single code as the orthogonal code series for each directional beam of the directional multibeam.

(9) Furthermore, as a generic feature, there is provided the radio base station for use in a radio system including a radio terminal and a radio base station having an array antenna with a plurality of antenna elements and capable of transmitting directional multibeam from the array antenna of the radio base station to the radio terminal in a state where a different orthogonal code series is allocated to each of a plurality of directional beams, the radio base station comprising: transmission means for transmitting directional multibeam of a downlink physical channel to the radio terminal, reception means for receiving identification information, transmitted from the radio terminal through an uplink physical channel, identifying an orthogonal code series determined as having a high autocorrelation out of the directional multibeam transmitted from the transmission means in the radio terminal, and determination means for determining an orthogonal code series for the downlink physical channel to the radio terminal on the basis of the orthogonal code series identification information received by the reception means.

(10) It is also acceptable that the transmission means may allocate a single code as the orthogonal code series for each directional beam of the directional multibeam.

(11) In addition, it is also appropriate that the transmission means may include an HS-SCCH transmission processing unit transmits a directional multibeam through an HS-SCCH (High Speed-Shared Control Channel) of an HSDPA (High Speed Downlink Packet Access) as the downlink physical channel.

(12) Still additionally, there is provided the radio terminal for use in a radio system including a radio terminal and a radio base station having an array antenna with a plurality of antenna elements and capable of transmitting a directional multibeam from the array antenna of the radio base station to the radio terminal apparatus in a state where a different orthogonal code series is allocated to each of a plurality of directional beams, the radio terminal comprising: reception means for receiving a directional multibeam of downlink physical channel from the radio base station, correlation determining means for obtaining each of correlation between the orthogonal code series of the directional multibeam received by the reception means and an orthogonal code series stored in the radio terminal, and determining an orthogonal code series having the highest autocorrelation, and transmission means for transmitting orthogonal code series identification information identifying the orthogonal code series, determined by the correlation determining means, to the radio base station through an uplink physical channel.

(13) It is also appropriate that the transmission means may include an HS-DPCCH transmission processing unit transmits the orthogonal code series identification information to the radio base station through an HS-DPCCH (High Speed-Dedicated Physical Control Channel) of an HSDPA (High Speed Downlink Packet Access) as the uplink physical channel.

(14) Moreover, it is also acceptable that the HS-DPCCH transmission processing unit may transmit the orthogonal code series identification information to the radio base station at a transmitting timing of an HARQ (Hybrid Automatic Repeat reQuest)-ACK symbol provided in the HS-DPCCH.

(15) Still moreover, it is also possible that the HS-DPCCH transmission processing unit may transmit the orthogonal code series identification information to the radio base station in a state superimposed on the HARQ-ACK symbol.

Advantages of the Invention

The present invention provides the following effects and advantages.

(1) A radio base station can carry out the allocation of an orthogonal code series which provides the most satisfactory reception state to a radio terminal apparatus.

In specifically, for the advertisement of the aforesaid orthogonal code series identification information to the radio base station, an uplink physical channel between the radio base station and the radio terminal is used unlike a previous technique employing an information symbol which enables the recognition of the information contents only when two or more radio frames (10 ms) are received so as to carry out the demodulation and decoding processing. In comparison with the previous technique, this can considerably shorten the time to be taken until the radio base station recognizes an orthogonal code series having the highest autocorrelation and a satisfactory reception condition in the radio terminal. In consequence, it is possible to greatly increase the speed of the loop control between the radio base station and the radio terminal which is for adaptively allocating an orthogonal code series having the best reception condition to the radio terminal, thereby considerably improving the throughput of a channel to be used for the transmission of user data.

(2) In addition, assuming that one kind of orthogonal code series (single code) is to be transmitted for each directional beam, it is possible to reduce the ratio of the transmission power for an orthogonal code series with respect to a total transmission power for the same beam, so the power corresponding to the reduction can be distributed to a channel for the transmission of user data, and further improvement of the throughput is expectable.

BRIEF DESCRIPTION OF THE DRAWINGS

FIG. 8 is a sequence diagram for explaining another operation (radio access method) of the HSDPA mobile communication system illustrated in FIG. 1.

DESCRIPTION OF REFERENCE NUMERALS

Figure 1:
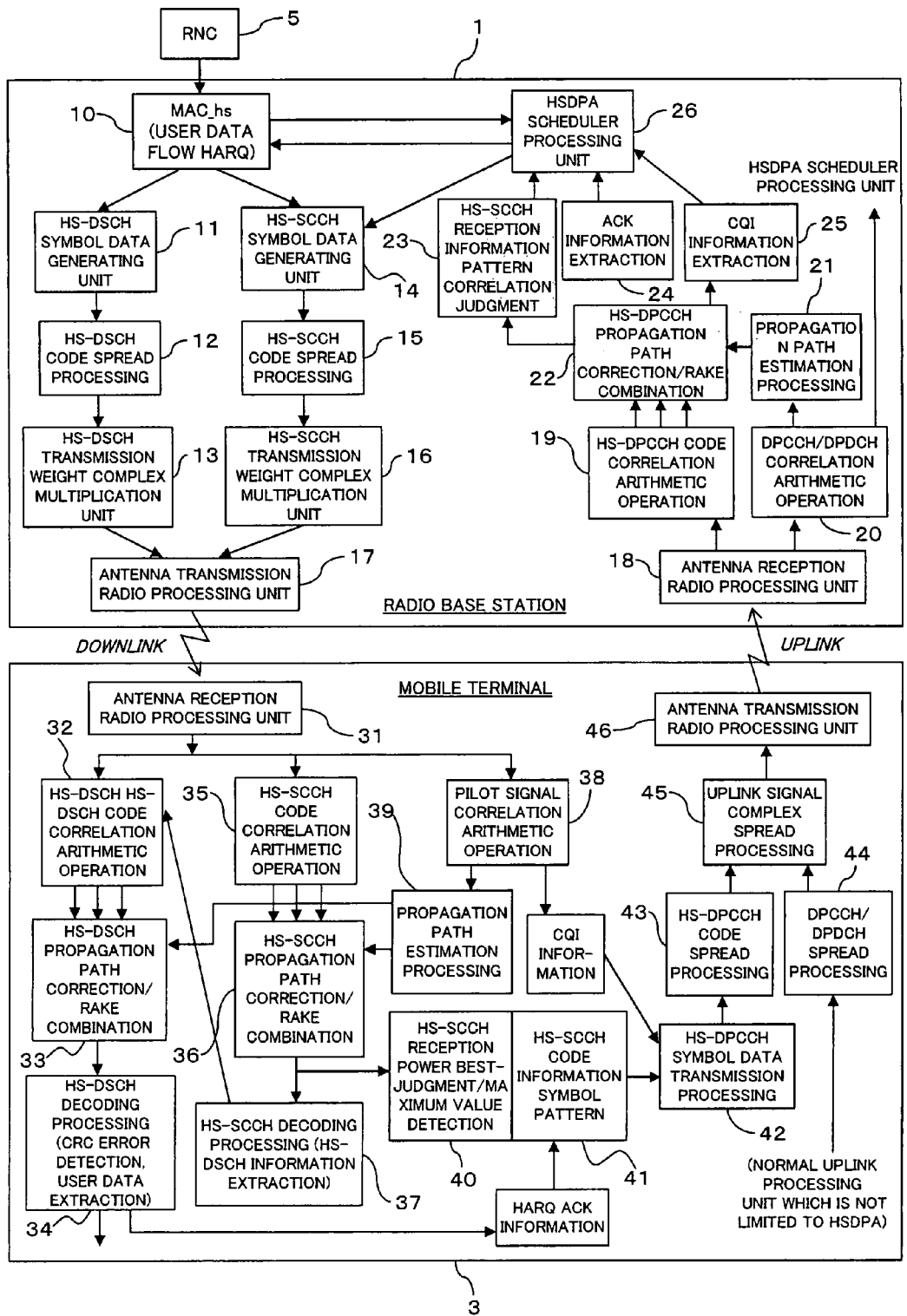
FIG. 1 is a block diagram illustrating a configuration of an HSDPA mobile communication system (radio system) according to an embodiment embodiment.

1 radio base station
10 MAC_hs processing unit
11 high-speed downlink common channel (HS-DSCH) symbol data generating unit
12 HS-DSCH code spread processing unit
13 HS-DSCH transmission weight complex multiplication unit
14 high-speed downlink common control channel (HS-SCCH) symbol data generating unit
15 HS-SCCH code spread processing unit
16 HS-SCCH transmission weight complex multiplication unit
17 antenna transmission radio processing unit
18 antenna reception radio processing unit
19 high-speed individual physical control channel (HS-DPCCH) code correlation arithmetic operation unit
20 individual physical control channel (DPCCH)/individual physical data channel (DPDCH) correlation arithmetic operation unit
21 propagation path estimation processing unit 22 high-speed individual physical control channel (HS-DPCCH) propagation path correction/rake combination unit
23 HS-SCCH reception information pattern correlation judging unit
231 multiplier
232 adder
233, 235, 236 memory
237 maximum power value judging unit
238 ACK/NACK information extracting unit
24 ACK information extracting unit
25 CQI information extracting unit
26 HSDPA scheduler processing unit
3 mobile terminal (radio terminal apparatus)
31 antenna reception radio processing unit
32 HS-DSCH code correlation arithmetic operation unit
33 HS-DSCH propagation path correction/rakecombination unit
34 HS-DSCH decoding processing unit
35 HS-SCCH code correlation arithmetic operation unit
36 HS-SCCH propagation path correction/rakecombination unit
37 HS-SCCH decoding processing unit
38 pilot signal correlation arithmetic operation unit
39 propagation path estimation processing unit
40 HS-SCCH reception power best-judgment/maximum value detection unit
41 HS-SCCH code information symbol pattern processing unit
42 HS-DPCCH symbol data transmission processing unit
421 multiplier
422 selector
43 HS-DPCCH code spread processing unit
44 DPCCH/DPDCH spread processing unit
45 uplink signal complex spread processing unit
46 antenna transmission radio processing unit
5 radio network control unit (RNC)

BEST MODE FOR CARRYING OUT THE INVENTION

An embodiment of the present invention will be described hereinbelow with reference to the drawings.

[A] Description of Embodiment

FIG. 1 is a block diagram showing a configuration of an HSDPA mobile communication system (radio system) according to an embodiment of the present invention. This system shown in FIG. 1 includes a radio base station 1 equipped with an adaptive array antenna or a multibeam antenna and capable of forming a plurality of directional beams (directional multibeam), a radio network control unit (RNC) 5 configured to accommodate and control a plurality of radio base stations 1 and one or more mobile terminals (radio terminals) 3, such as portable telephones or mobile PC terminals, accessible through wireless lines to the radio base station 1. The radio base station (which will hereinafter be referred to simply as "base station") 1 includes an MAC_hs processing unit 10, a high-speed downlink common channel (HS-DSCH) symbol data generating unit 11, an HS-DSCH code spread processing unit 12, an HS-DSCH transmission weight complex multiplication unit 13, a high-speed down common control channel (HS-SCCH) symbol data generating unit 14, an HS-SCCH code spread processing unit 15, an HS-SCCH transmission weight complex multiplication unit 16, an antenna transmission radio processing unit 17, an antenna reception radio processing unit 18, a high-speed individual physical control channel (HS-DPCCH) code correlation arithmetic operation unit 19, an individual physical control channel (DPCCH)/individual physical data channel (DPDCH) correlation arithmetic operation unit 20, a propagation path estimation processing unit 21, a high-speed individual physical control channel (HS-DPCCH) propagation path correction/rake combination unit 22, an HS-SCCH reception information pattern correlation judging unit 23, an ACK information extracting unit 24, a CQI information extracting unit 25, and an HSDPA scheduler processing unit 26.

On the other hand, the mobile terminal (which will hereinafter be referred to "mobile station") 3 includes an antenna reception radio processing unit 31, an HS-DSCH code correlation arithmetic operation unit 32, an HS-DSCH propagation path correction/rake combination unit 33, an HS-DSCH decoding processing unit 34, an HS-SCCH code correlation arithmetic operation unit 35, an HS-SCCH propagation path correction/rake combination unit 36, an HS-SCCH decoding processing unit 37, a pilot signal correlation arithmetic operation unit 38, a propagation path estimation processing unit 39, an HS-SCCH reception power best-judgment/maximum value detection unit 40, an HS-SCCH code information symbol pattern processing unit 41, an HS-DPCCH symbol data transmission processing unit 42, an HS-DPCCH code spread processing unit 43, a DPCCH/DPDCH spread processing unit 44, an uplink signal complex spread processing unit 45, and an antenna transmission radio processing unit 46.

In the base station 1, the MAC_hs processing unit 10 is for carrying out the MAC_hs processing which is the processing in an MAC (Medium Access Control) layer (particularly, an MAC layer for the HSDPA), and it has a function to buffer a user data flow (data packet) received from the RNC 5 for dividing the user data according to a transmission data rate corresponding to a modulation mode (16QAM or QPSK) and for extracting needed user data from the buffered data upon receipt of the HARQ.

The HS-DSCH symbol data generating unit 11 is for generating HS-DSCH symbol data on the basis of the data packet from the MAC_hs processing unit 10, and the HS-DSCH code spread processing unit 12 is for carrying out spread processing on the HS-DSCH symbol data, generated by the HS-DSCH symbol data generating unit 11, with a predetermined spread code (HS-DSCH code). Of a predetermined number of spread codes (for example, 15 kinds), one or more spread codes can be allocated to one user (mobile station 3).

The HS-DSCH transmission weight complex multiplication unit 13 is for multiplying the HS-DSCH symbol data after the spread processing by a transmission weighting factor (weight) for the formation of a directional beam.

The HS-SCCH symbol data generating unit 14 is for generating HS-SCCH symbol data prior to the HS-DSCH transmission (preceding by two slots), and the HS-SCCH code spread processing unit 15 is for carrying out the spread processing on the HS-SCCH symbol data, generated by the HS-SCCH symbol data generating unit 14, with a predetermined spread code (which will hereinafter be referred to equally as an HS-SCCH code) and, in this embodiment, a different HS-SCCH code (orthogonal code series such as Walsh code) is allocated to each of a plurality of HS-SCCH directional beams to be formed, as will be mentioned later with reference to FIG. 2. Incidentally, the HS-SCCH is a downlink physical channel prepared (provided) specially for the high-speed loop control with respect to the mobile station 3 in the 3GPP.

The HS-SCCH transmission weight complex multiplication unit 16 is for multiplying the HS-SCCH symbol data after the aforesaid spread processing by a transmission weighting factor (weight) for the formation of the aforesaid directional beam.

Figure 2:
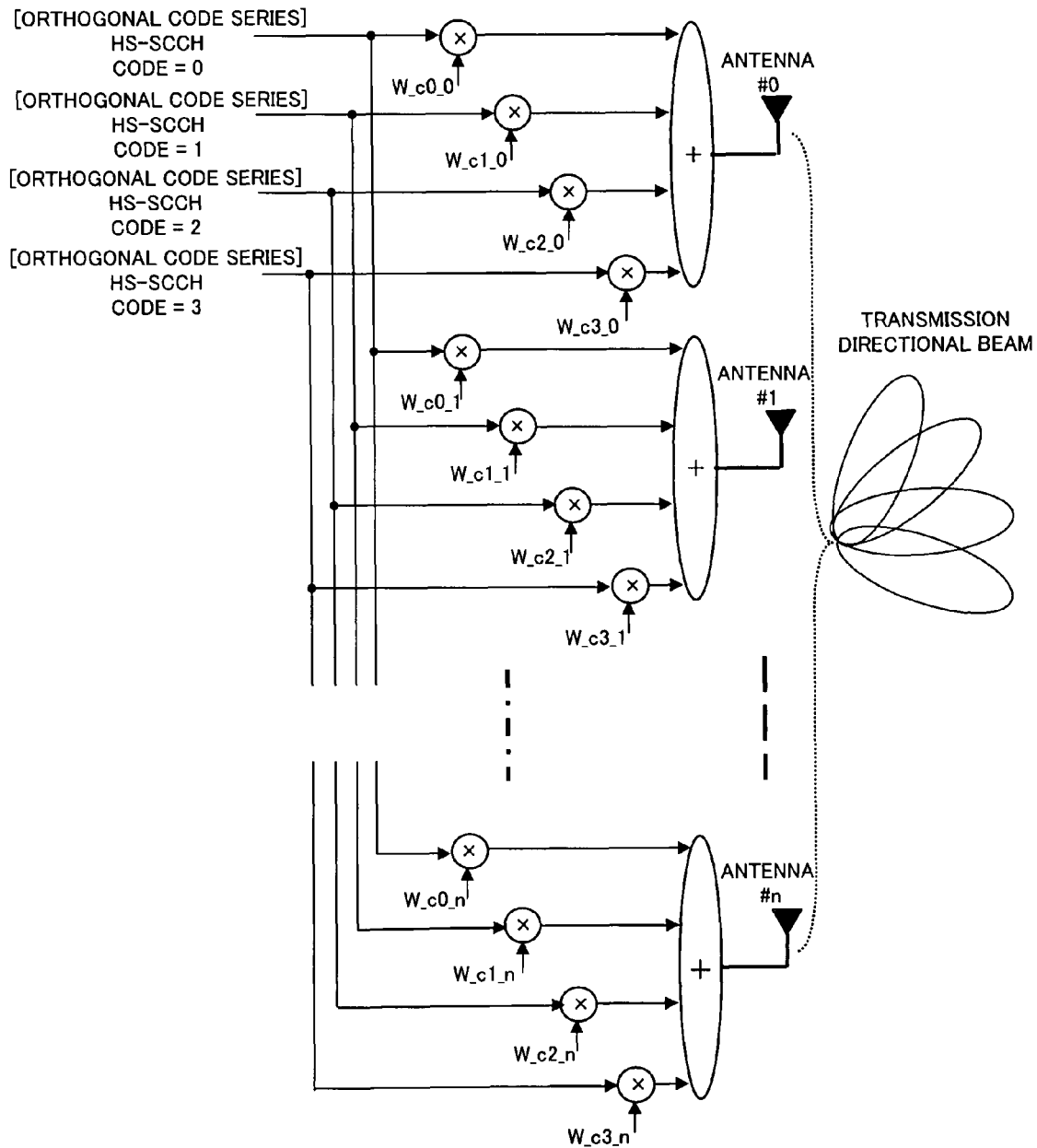
FIG. 2 is an illustration for explaining HS-SCCH code allocation and directional multibeam formation according to the embodiment.

The functions of these HS-SCCH symbol data generating unit 14, HS-SCCH code spread processing unit 15, HS-SCCH transmission weight complex multiplication unit 16 and antenna transmission radio processing unit 17 form transmission directional multibeam to which different HS-SCCH codes are allocated, for example, as shown in FIG. 2. That is, these units 14, 15, 16 and 17 function as transmission means (HS-SCCH transmission processing unit) for transmitting directional multibeam with respect to a downlink physical channel to the mobile station 3, particularly, with respect to the HS-SCCH.

In more details, for example, in a case in which four kinds of orthogonal code series having code numbers i=0, 1, 2 and 3 are allocated as the HS-SCCH codes, by multiplying each of the HS-SCCHs with four kinds of codes to a j-th (j=1 to n, and n is an integer equal to or more than 2) antenna #j by a transmission weight W_ci_j, it is possible to form transmission directional multibeam where a different HS-SCCH code is allocated to each directional beam.

If the base station 1 and a plurality of mobile stations 3 share the same HS-SCCH code, a plurality of HS-SCCH codes to be transmitted through a plurality of directional beams at the same time are classified in units of directional beams as given code series. Moreover, in directional multibeam to be transmitted from the base station 1 or another base station 1, different HS-SCCH codes (orthogonal code series) are allocated between the directional beams adjacent to each other.

Furthermore, in the base station 1 shown in FIG. 1, the antenna transmission radio processing unit 17 has a function to frequency-convert (upconvert) the HS-SCCH and HS-DSCH transmission symbol data from the above-mentioned multiplication units 13 and 16 into predetermined radio frequencies and transmit them.

The antenna reception radio processing unit 18 is for receiving an up (uplink) data packet transmitted with a radio frequency from the mobile station 3 and carrying out required radio reception processing such as frequency-converting (downconverting) it into a base band signal, and the HS-DPCCH code correlation arithmetic operation unit 19 is for calculating a correlation between the data packet received by the antenna reception radio processing unit 18 and an HS-DPCCH spread code held in the base station 1 side to extract an HS-DPCCH data symbol. Moreover, the DPCCH/DPDCH correlation arithmetic operation unit 20 is for calculating a correlation between the data packet received by the antenna reception radio processing unit 18 and DPCH and DPDCH spread codes held in the base station 1 side to extract DPCH and DPDCH data symbols, with these data symbols being outputted to a normal uplink processing unit without being limited to the HSDPA.

The propagation path estimation processing unit 21 is for carrying out the processing on propagation path estimation with respect to the mobile station 3 based on a DPCCH pilot symbol extracted from the DPCCH/DPDCH correlation arithmetic operation unit 20, and the HS-DPCCH propagation path correction/rake combination unit 22 is for carrying out the propagation path correction on the HS-DPCCH data symbol extracted by the HS-DPCCH code correlation arithmetic operation unit 19 based on a result of the propagation path estimation obtained by the propagation path estimation processing unit 21 and further for conducting the rake combination.

The HS-SCCH reception information pattern correlation judging unit 23 is for calculating autocorrelations between the aforesaid HS-DPCCH data symbol and a plurality of its own HS-SCCH code (for example, at least four codes) patterns so as to judge and recognize the highest autocorrelation for determining the HS-SCCH code number (HS-SCCH best-sensitivity code number information) of a directional beam with the highest reception sensitivity of the directional multibeam from the base station 1. The details thereof will be mentioned later. Incidentally, the HS-DPCCH is also an uplink physical channel prepared (provided) specially in the 3GPP for the aforesaid high-speed loop control.

That is, the above-mentioned antenna reception radio processing unit 18, HS-DPCCH code correlation arithmetic operation unit 19 and HS-DPCCH propagation path correction/rake combination unit 22 function as a reception means to receive the HS-SCCH best-sensitivity code number information advertised from the mobile station 3 through the use of the HS-DPCCH based on the judgment (determination) indicating a high autocorrelation in the mobile station 3, while the HS-SCCH reception information pattern correlation judging unit 23 functions as a determination means to determine an HS-SCCH code to be used for a transmission to the mobile station 3 based on the received HS-SCCH best-sensitivity code number information.

The ACK information extracting unit 24 is for extracting an ACK signal or NACK signal which is to be transmitted in accordance with the reception propriety of data in the mobile station 3, and the CQI information extracting unit 25 is for extracting CQI information (reception quality in the mobile station 3) from the aforesaid HS-DPCCH data symbol.

The HSDPA scheduler processing unit 26 is configured to make a communication with the aforesaid MAC_hs processing unit 10 for carrying out the data transmission to the mobile station 3, i.e., conducting the downlink HS-SCCH and HS-DSCH scheduling. That is, the HSDPA scheduler processing unit 26 not only executes a retransmission instruction in a case in which an NACK signal is received by the ACK information extracting unit 24 and a modulation mode switching instruction (between QPSK and 16QAM) according to the CQI information extracted by the CQI information extracting unit 25 but also gives an HS-SCCH code changing instruction to the HS-SCCH symbol data generating unit 14 (or the HS-SCCH code spread processing unit 15) so that the following HS-SCCH transmission is made on the basis of the HS-SCCH code recognized by the HS-SCCH reception information pattern correlation judging unit 23. Moreover, in the case of the reception of the HS-SCCH best-sensitivity code number information from a plurality of mobile stations 3, if the HS-SCCH best-sensitivity code number information from the different mobile stations 3 are identical to each other, it fulfills a function to transmit a signal to each of the mobile stations 3 in a time division mode and, in the case of the same time, carries out a function to make the allocation among the mobile stations 3 which have advertised different HS-SCCH codes.

Meanwhile, in the mobile station 3, the antenna reception radio processing unit 31 is configured to receive a down (downlink) data packet transmitted at a radio frequency from the base station 1 to carry out the required radio reception processing such as a frequency conversion (downconvert) into a baseband signal, and the HS-DSCH code correlation arithmetic operation unit 32 is made to calculate a correlation between the data packet (symbol data) received by the antenna reception radio processing unit 31 and its own HS-DSCH code for extracting the HS-DSCH symbol data.

The HS-DSCH propagation path correction/rake combination unit 33 is configured to carry out the propagation path correction on the HS-DSCH data symbol extracted by the HS-DSCH code correlation arithmetic operation unit 32 based on a result of the propagation path estimation relative to the base station 1 obtained by the propagation path estimation processing unit 39 and further to conduct the rake combination. The HS-DSCH decoding processing unit 34 is configured to conduct the decoding and CRC error detection on the HS-DSCH data symbol after the propagation path correction and rake combination and further to extract the user data. If the CRC error detection result indicates OK, ACK information is generated while if the CRC error detection result indicates NG, NACK information is generated as retransmission request information (HARQ-ACK information) to be transmitted to the base station 1.

Since the HS-DSCH is provided to be received after a delay corresponding to two slots with respect to the leading frame of the HS-SCCH, the above-mentioned processing on the HS-DSCH starts when the HS-SCCH is decoded by the HS-SCCH decoding processing unit 37 and the reception timing thereof is advertised to the HS-DSCH code correlation arithmetic operation unit 32.

The HS-SCCH code correlation arithmetic operation unit 35 is configured to calculate a correlation between the data packet (symbol data) received by the antenna reception radio processing unit 31 and its own HS-SCCH code for extracting the HS-SCCH symbol data, and the HS-SCCH propagation path correction/rake combination unit 36 is configured to carry out the propagation path correction on the HS-SCCH data symbol extracted by the HS-SCCH code correlation arithmetic operation unit 35 based on a result of the propagation path estimation relative to the base station 1 obtained by the propagation path estimation processing unit 39 and further to conduct the rake combination. The HS-SCCH decoding processing unit 37 is configured to carry out the needed decoding processing on the HS-SCCH symbol data after the propagation path correction and rake combination, extract information indicative of the reception timing of the HS-DSCH received in a state delayed by two slots with respect to the leading frame of the HS-SCCH and advertise this information to the HS-DSCH correlation arithmetic operation unit 32.

That is, the block including the above-mentioned antenna reception radio processing unit 31, HS-SCCH code correlation arithmetic operation unit 35, HS-SCCH propagation path correction/rake combination unit 36 and HS-SCCH decoding processing unit 37 functions as a reception means to receive a directional multibeam from the base station 1 in terms of the downlink physical channel (HS-SCCH) with respect to the base station 1.

The pilot signal correlation arithmetic operation unit 38 is configured to calculate a correlation between the data packet (symbol data) received by the antenna reception radio processing unit 31 and a known signal (pilot signal) to extract a pilot signal and further to estimate a reception SIR based on this pilot signal for generating a result of the estimation as CQI information to be feedbacked through the HS-DPCCH to the base station 1. The CQI information is handed over to the HS-DPCCH symbol data transmission processing unit 42.

The propagation path estimation processing unit 39 is for making a propagation path estimation with respect to the base station 1 on the basis of the pilot signal obtained by this pilot signal correlation arithmetic operation unit 38, with the estimation result being used for the propagation path correction in the HS-DSCH propagation path correction/rake combination unit 33 and the HS-SCCH propagation path correction/rake combination unit 36 as mentioned above.

The HS-SCCH reception power best-judgment/maximum value detection unit 40 is for making a judgment on the reception power (electric power) of the HS-SCCH after the propagation path correction and rake combination conducted by the HS-SCCH propagation path correction/rake combination unit 36 so as to detect a maximum value. Concretely, since the correlation arithmetic operation on a plurality of (four kinds) HS-SCCH codes is conducted in the HS-SCCH code correlation arithmetic operation unit 35, the HS-SCCH reception power best-judgment utilizes a result of this correlation arithmetic operation. Generally, the correlation arithmetic operation result becomes a vector quantity on an X-Y orthogonal phase plane. It is possible to obtain the power value of each of the HS-SCCH codes by calculating the square sum of the vector quantity, so the best code judgment can be made by detecting the maximum value from the respective power values.

For example, let it be assumed that the correlation arithmetic operation result vectors of the HS-SCCH code numbers 0 to 3 are $(r\_SC\_X\_0, r\_SC\_Y\_0)$, $(r\_SC\_X\_1, r\_SC\_Y\_1)$, $(r\_SC\_X\_2, r\_SC\_Y\_2)$, $(r\_SC\_X\_3, r\_SC\_Y\_3)$ $[(r\_SC\_X\_n, r\_SC\_Y\_n): n=0$ to $15]$. Through the use of the square sum calculation, the reception power of the code number 0 is obtainable as $P\_sc\_0=(r\_SC\_X\_0^2+r\_SC\_Y\_0^2)$. Let us assume that the power values of the respective HS-SCCH codes are $P\_sc\_1, P\_sc\_2$ and $P\_sc\_3$, $[P\_sc\_n; n=0$ to $15]$ like the above description. The judgment on a maximum value can be made by successively making a comparison among the power values of four kinds of codes from $P\_sc\_0$ to $P\_sc\_3$.

That is, each of the HS-SCCH code correlation arithmetic operation unit 35 and the HS-SCCH reception power best-judgment/maximum value detection unit 40 fulfills a function to obtain a correlation between the HS-SCCH code of the aforesaid directional multibeam and its own (mobile station 3) HS-SCCH for determining the HS-SCCH having the highest autocorrelation.

The HS-SCCH code information symbol pattern processing unit 41 is for detecting a symbol pattern of the HS-SCCH code with the maximum reception power detected by the HS-SCCH reception power best-judgment/maximum value detection unit 40 as mentioned above and advertising the information on this HS-SCCH code to the HS-DPCCH symbol data transmission processing unit 42 so that it is transmitted through the HS-DPCCH to the base station 1.

Figure 3:
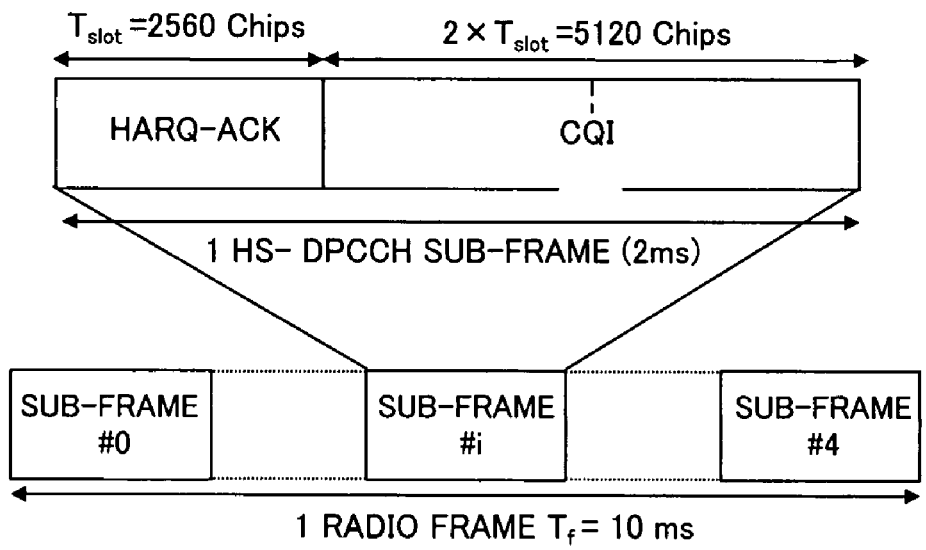
FIG. 3 is diagram illustrating frame structures of a 3GPP-provided radio frame and an HS-DPCCH sub-frame for explaining a position of a symbol to which appended is an HS-SCCH best-sensitivity code number information according to the embodiment.

Concretely, for example, as shown in FIG. 3, in the case of the HSDPA, the HS-DPCCH is provided such that five HS-DPCCH sub-frames (each 2 ms) constitute a single radio frame ($T_f=10$ ms) and, with respect to a single HS-DPCCH sub-frame, the aforesaid HARQ-ACK information is transmitted using a single time slot ($T_{slot}=2560$ chips [10 symbols=256 chips×10@SF=256]) while the aforesaid CQI information is transmitted using two time slots ($2×T_{slot}=5120$ chips). On the other hand, according to this embodiment, for example, it is possible that, by using a transmission time slot (HARQ-ACK symbol position) in the case of the absence of HARQ-ACK information to be transmitted, the HS-SCCH code information on the maximum reception power (HS-SCCH best-sensitivity code number information) is appended and transmitted as a transmission symbol pattern [orthogonal code series identification information (identification pattern)] as shown in the following table 1.

TABLE 1

Transmission Symbol Pattern (One Example: 0 = +1, 1 = −1)

| code NO. | Symbol Nos. 0-9 (One Symbol = 256 chips) | | | | | | | | | |
|---|---|---|---|---|---|---|---|---|---|---|
| | 0 | 1 | 2 | 3 | 4 | 5 | 6 | 7 | 8 | 9 |
| 0 | 0 | 0 | 0 | 0 | 1 | 0 | 1 | 1 | 1 | 1 |
| 1 | 0 | 0 | 0 | 1 | 1 | 0 | 1 | 1 | 1 | 0 |
| 2 | 0 | 0 | 1 | 0 | 1 | 0 | 1 | 1 | 0 | 1 |
| 3 | 0 | 0 | 1 | 1 | 1 | 0 | 1 | 1 | 0 | 0 |
| 4 | 0 | 1 | 0 | 0 | 1 | 0 | 1 | 0 | 1 | 1 |
| 5 | 0 | 1 | 0 | 1 | 1 | 0 | 1 | 0 | 1 | 0 |
| 6 | 0 | 1 | 1 | 0 | 1 | 0 | 1 | 0 | 0 | 1 |
| 7 | 0 | 1 | 1 | 1 | 1 | 0 | 1 | 0 | 0 | 0 |
| 8 | 1 | 0 | 0 | 0 | 0 | 1 | 0 | 1 | 1 | 1 |
| 9 | 1 | 0 | 0 | 1 | 0 | 1 | 0 | 1 | 1 | 0 |
| 10 | 1 | 0 | 1 | 0 | 0 | 1 | 0 | 1 | 0 | 1 |
| 11 | 1 | 0 | 1 | 1 | 0 | 1 | 0 | 1 | 0 | 0 |
| 12 | 1 | 1 | 0 | 0 | 0 | 1 | 0 | 0 | 1 | 1 |
| 13 | 1 | 1 | 0 | 1 | 0 | 1 | 0 | 0 | 1 | 0 |
| 14 | 1 | 1 | 1 | 0 | 0 | 1 | 0 | 0 | 0 | 1 |
| 15 | 1 | 1 | 1 | 1 | 0 | 1 | 0 | 0 | 0 | 0 |

Figure 4:
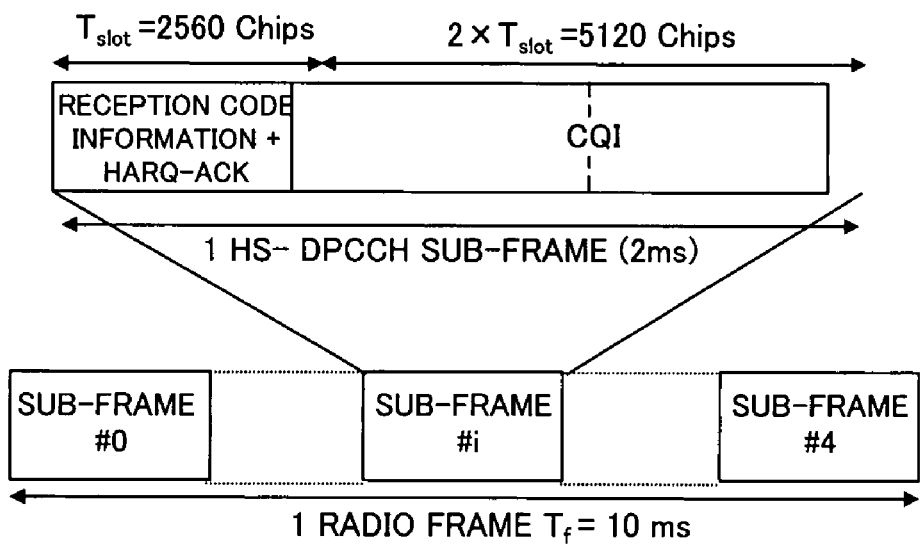
FIG. 4 is a diagram illustrating frame structures of a 3GPP-provided radio frame and an HS-DPCCH sub-frame for explaining a position of a symbol to which appended is an HS-SCCH best-sensitivity code number information according to the embodiment.

The base station 1 also has the pattern shown in this table 1, and the symbol pattern is inverted laterally about the timing of the symbol position indicated by the bold figures. Moreover, for example, as shown in FIG. 4, it is also possible that the above-mentioned HS-SCCH best-sensitivity code number is transmitted in a state superimposed (multiplied) on HARQ-ACK information to be transmitted. That is, in a case in which an ACK/NACK signal is transmitted as the HARQ-ACK information (retransmission control information) after the HS-PDSCH demodulation, by multiplying the existing 0/1 fixed symbol shown in the following table 2 by the aforesaid table 1, it is possible to simultaneously transmit the HARQ-ACK information and the HS-SCCH best-sensitivity code number information to the base station 1 with a single time slot.

TABLE 2

Transmission of HARQ-ACK Retransmission Control Information According to 3GPP regulations

| | Symbol Nos. 0-9 (One Symbol = 256 chips) | | | | | | | | | |
|---|---|---|---|---|---|---|---|---|---|---|
| | 0 | 1 | 2 | 3 | 4 | 5 | 6 | 7 | 8 | 9 |
| ACK | 1 | 1 | 1 | 1 | 1 | 1 | 1 | 1 | 1 | 1 |
| NACK | 0 | 0 | 0 | 0 | 0 | 0 | 0 | 0 | 0 | 0 |

The HS-DPCCH symbol data transmission processing unit 42 is for generating and transmitting HS-DPCCH symbol data to the base station 1 and is capable of transmitting the aforesaid HS-SCCH best-sensitivity code number information through the use of the HARQ-ACK information transmission time slot at the assembling of an HS-DPCCH sub-frame as mentioned above.

That is, the above-mentioned HS-SCCH code information symbol pattern processing unit 41 and HS-DPCCH symbol data transmission processing unit 42, together with the HS-DPCCH code spread processing unit 43, the uplink complex spread processing unit 45 and the antenna transmission radio processing unit 46, function as a transmission means (HS-DPCCH transmission processing unit) to advertise the determined HS-SCCH best-sensitivity code number information to the base station 1 through the use of the uplink physical channel (HS-DPCCH).

Figure 5:
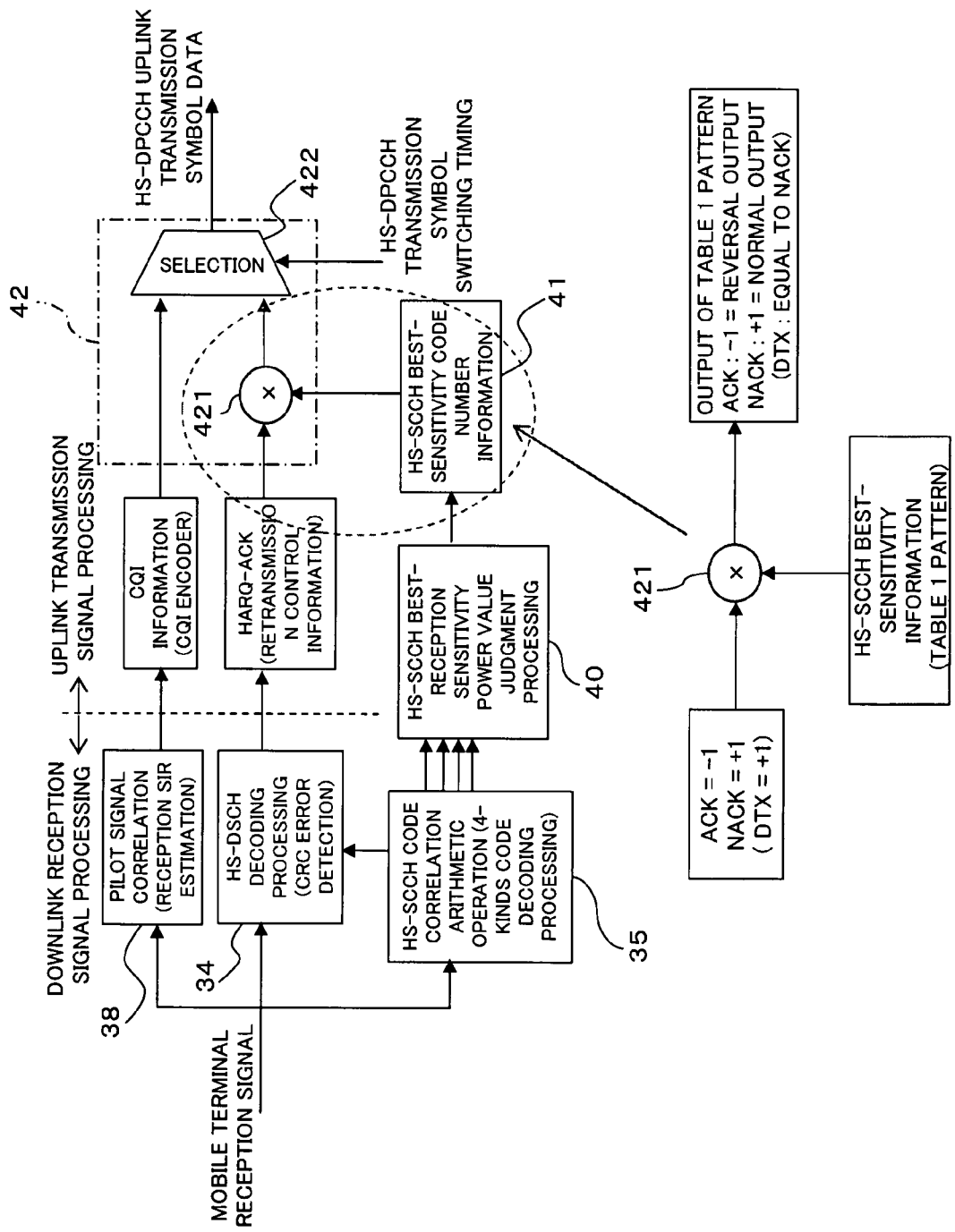
FIG. 5 is a block diagram illustrating a configuration of an essential part of a mobile terminal apparatus illustrated in FIG. 1 for explaining transmission processing on the HS-SCCH best-sensitivity code number information according to the embodiment.

Thus, for example, as shown in FIG. 5, the HS-DPCCH symbol data transmission processing unit 42 includes a multiplier 421 for multiplying the HARQ-ACK information (retransmission control information) obtained through the decoding processing in the HS-DSCH decoding processing unit 34 by the HS-SCCH best-sensitivity code number information from the HS-SCCH code information symbol pattern processing unit 41 and a selector 422 for selectively outputting an output of this multiplier 421 and the CQI information, obtained by the pilot signal correlation arithmetic operation unit 38, according to an HS-DPCCH transmission symbol switching timing signal.

Therefore, when no HARQ-ACK information to be transmitted within an HS-DPCCH sub-frame time period exists, the HS-SCCH best-sensitivity code number information with the pattern shown in the table 1 is transmitted independently, while if HARQ-ACK information to be transmitted exists, the pattern shown in the table 1 and the pattern shown in the table 2 are multiplied in the multiplier 421, so the HARQ-ACK information and the HS-SCCH best-sensitivity code number information are transmitted in a state superimposed on each other.

In more details, the HARQ-ACK information is transmitted in the following three conditions (however, the amplitude is set at 1 and indicated in a state normalized):

(1) A condition of no reception of HS-DSCH (high-speed packet data): DTX=a0 (Non-transmission);

(2) A condition of normal reception of HS-DSCH and no data error: ACK=−1; and (3) A condition of normal reception of HS-DSCH and occurrence of data error: NACK=+1.

The HS-SCCH code information symbol pattern processing unit 41 outputs the HS-SCCH best-sensitivity code number information as "+1" or "−1" according to the pattern shown in the table 1. In a case in which it is transmitted simultaneously with the HARQ-ACK information (ACK/NACK information), the ACK/NACK information (−1/+1) and code pattern data (+1/−1) outputted according to the table 1 are multiplied in the multiplier 421. Thus, in the NACK condition (+1), the pattern of the HS-SCCH best-sensitivity code number information is outputted intact while, in the ACK condition, the same patterns are all transmitted in a state inverted. In the non-transmission (DTX) condition, the transmission of only the HS-SCCH best-sensitivity code number information is acceptable, so the input of the multiplier 421 is fixed to "+1".

In this case, the reception processing on the base station 1 side is as follows.

The base station 1 grasps all the sectors, to which the corresponding user (mobile station 3) has access and the HS-SCCH code numbers sent to these sectors. Therefore, on the basis of the pattern shown in the table 1, it is possible to separate the HARQ-ACK information (ACK/NACK) and the HS-SCCH best-sensitivity code number information by the code numbers (four kinds) transmitted to the sector of this user.

Figure 6:
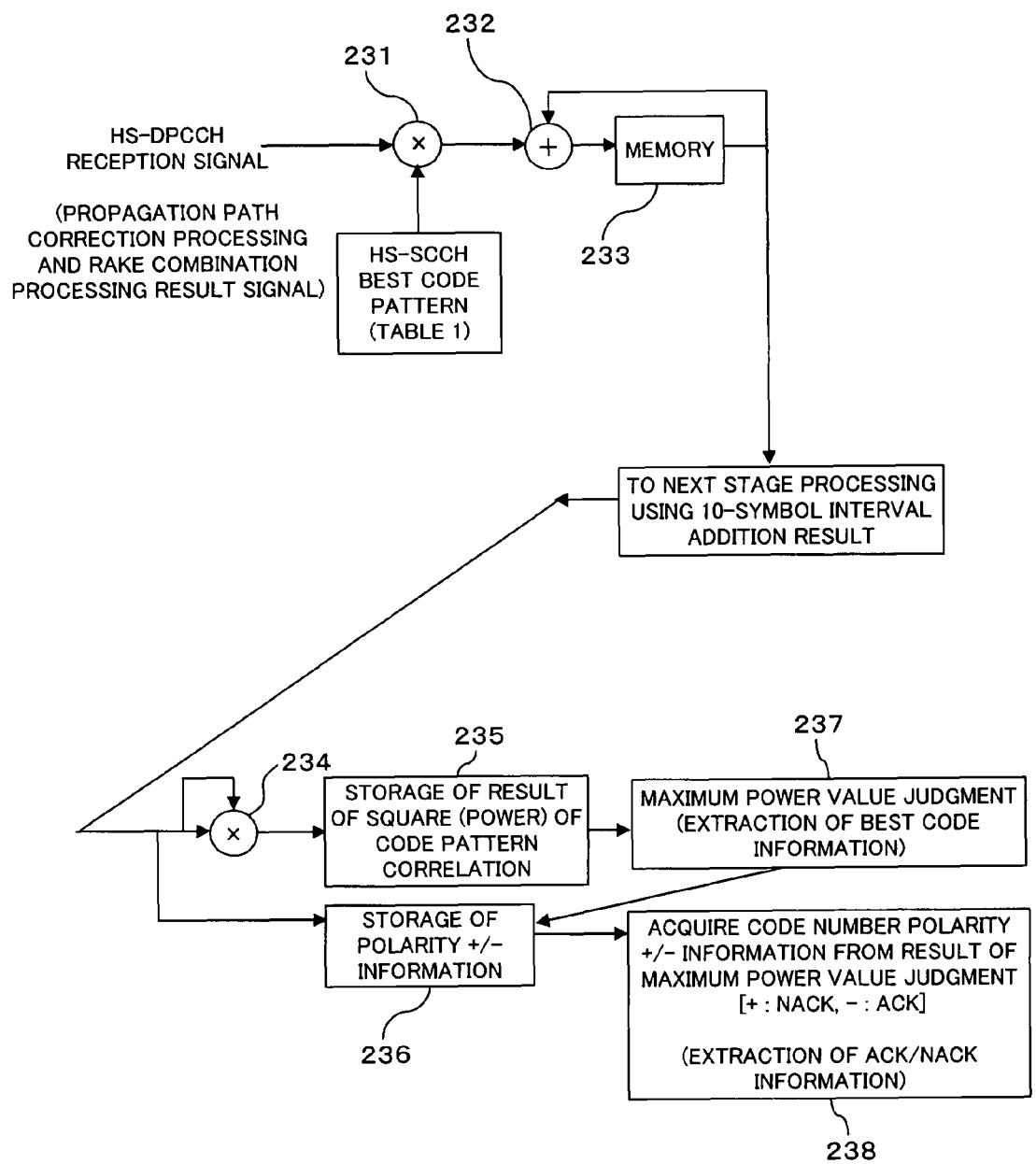
FIG. 6 is an illustration for explaining HS-SCCH best-sensitivity code number information extraction and HARQ-ACK information extraction processing in the HSDPA mobile communication system illustrated in FIG. 1.

That is, for example, as shown in FIG. 6, the HS-SCCH reception information pattern correlation judging unit 23 of the base station 1 multiplies an HS-DPCCH reception signal by the relevant code (four kinds) pattern of the pattern shown in the table 1 in the above-mentioned 231 and adds (cumulatively adds) this multiplication result to, for example, 10 symbols through the use of the adder 232 and the memory 233. In this case, a memory area is independently used for each code pattern. The aforesaid result is set at 0 for the leading symbol and the addition starts newly in this state.

Following this, the square (electric power) of the addition result of the 10 symbols is calculated in the multiplier 234 and the multiplication result is stored in the memory 235. Moreover, the polarity (+1/−1) of the addition result of the 10 symbols is also stored in the memory 236. Since, with respect to the square of the aforesaid addition result, the amplitude value corresponding to that matching with the code pattern the mobile station transmits reaches a maximum, the maximum power value judging unit 237 judges it on the basis of the stored contents in the memory 235 to extract the HS-SCCH best-sensitivity code number information. Moreover, since the polarity (−/+) of the HS-SCCH best-sensitivity code number information becomes the ACK/NACK information, the ACK/NACK information extracting unit 238 acquires it from the memory 236.

In the aforesaid table 1, a set of the code numbers 0 and 15, a set of the code numbers 1 and 14, a set of the code numbers 2 and 13, . . . , a set of the code numbers 7 and 8 take inverted patterns, respectively. For this reason, for example, even in the case of a section which requires the processing on only the code numbers 0 to 3, a result of the received signal multiplication using the numbers 15 to 12 and 10-symbol addition shows that the highest amplitude value appears in code patterns having an inversion relationship and the ACK/NACK information also inverts. A combination of these relations can reduce the mistaken judgment on the ACK/NACK and HS-SCCH reception information.

Furthermore, in FIG. 1, the HS-DPCCH code spread processing unit 43 is for conducting the spread processing on the HS-DPCCH symbol data from the aforesaid HS-DPCCH symbol data transmission processing unit 42 with a predetermined spread code (HS-DPCCH code), and the DPCCH/DPDCH spread processing unit 44 is for carrying out the spread processing on each of the DPCCH and DPDCH symbol data from a normal uplink processing unit, which is not limited to the HSDPA, with a predetermined spread code (DPCCH code/DPDCH code).

The uplink signal complex spread processing unit 45 is for carrying out the complex spread processing on uplink signals (HS-DPCCH, DPCCH and DPDCH symbol data) after the spread processing by the HS-DPCCH code spread processing unit 43 and the DPCCH/DPDCH spread processing unit 44, and the antenna transmission radio processing unit 46 is for conducting the needed radio transmission processing such as converting (upconverting) the uplink signals after the complex spread processing obtained by this uplink signal complex spread processing unit 45 into a radio frequency and further for transmitting them to the base station 1.

A detailed description will be given hereinbelow of an operation of the HSDPA mobile communication system according to this embodiment configured as described above.

Figure 7:
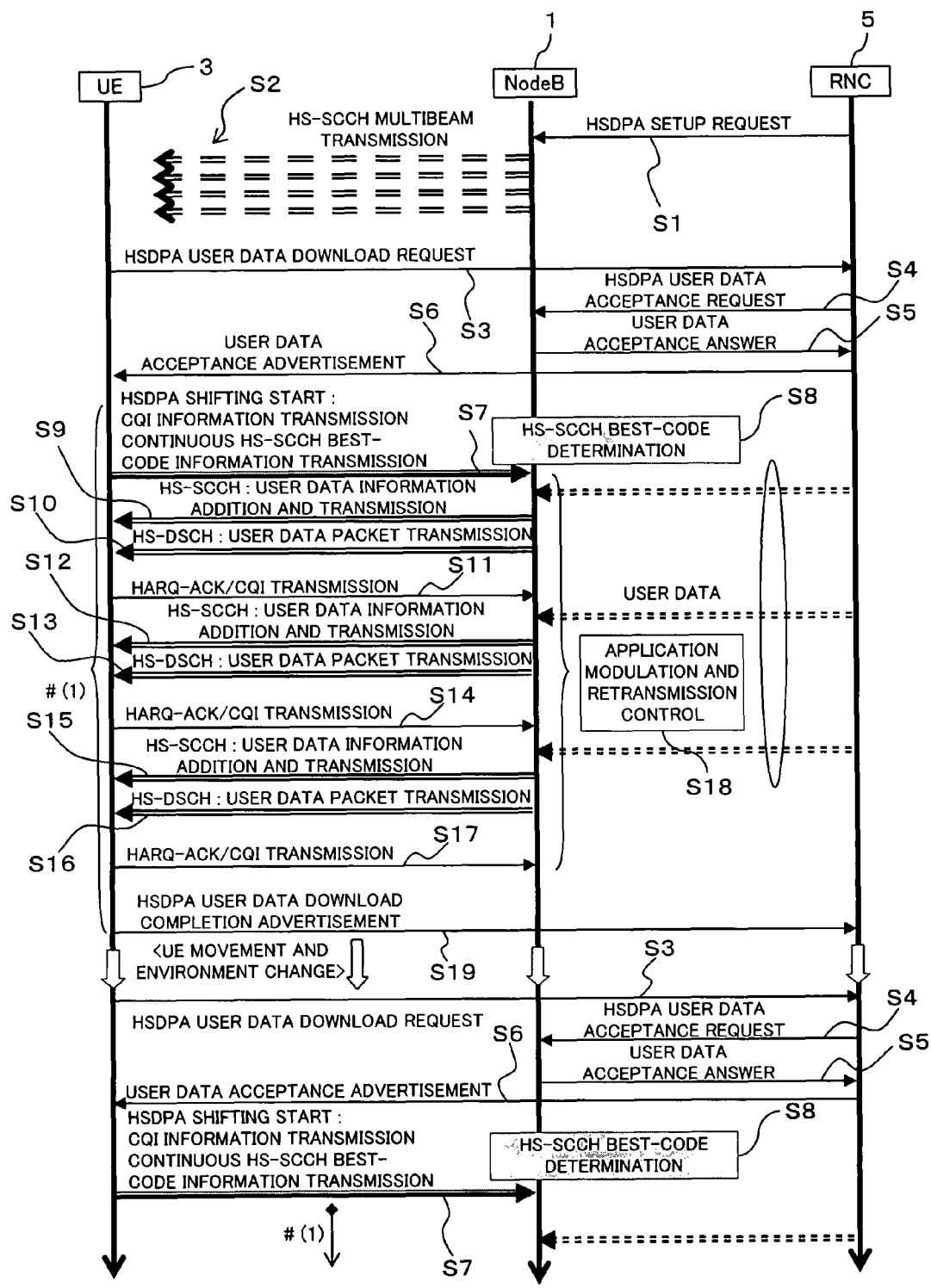
FIG. 7 is a sequence diagram for explaining an operation (radio access method) of the HSDPA mobile communication system illustrated in FIG. 1.

(1) Operation Example 1 (FIG. 7)

First of all, for example, when an HSDPA setup request is sent from the RNC 5 to the base station (NodeB) 1 (step S1), the base station 1 transmits HS-SCCH directional multibeam, where a different HS-SCCH code is allocated to each beam, through the use of the HS-SCCH symbol data generating unit 14, the HS-SCCH code spread processing unit 15, the HS-SCCH transmission weight complex multiplication unit 16 and the antenna transmission radio processing unit 17 (step S2).

In this state, when the mobile station (UE: User Equipment) 3 makes a request for the download of HSDPA user data to the base station 1, this download request is transmitted through the base station 1 to the RNC 5 (step S3), and the RNC 5 transmits a request for the acceptance of the HSDPA user data (high-speed packet data) (step S4). The base station 1 returns an answer (OK or NG) to this acceptance to the RNC 5 (step S5) and, if this answer indicates OK, the RNC 5 transmits a user data acceptance advertisement through the base station 1 to the mobile station 3 (step S6).

Upon receipt of the aforesaid user data acceptance advertisement, the mobile station 3 starts to shift to the HSDPA and generates CQI information through the use of the pilot signal correlation arithmetic operation unit 38 and transmits it through the HS-DPCCH by means of the HS-DPCCH symbol data transmission processing unit 42, the HS-DPCCH code spread processing unit 43, the uplink signal complex spread processing unit 45 and the antenna transmission radio processing unit 46. At this time, the mobile station 2 selects and determines the HS-SCCH best-sensitivity code number information indicative of the maximum reception power of the HS-SCCH directional multibeam from the base station 1 by means of the HS-SCCH code correlation arithmetic operation unit 35, the HS-SCCH propagation path correction/rakecombination unit 36, the HS-SCCH reception power best-judgment/maximum value detection unit 40 and the HS-SCCH code information symbol pattern processing unit 41. The mobile station 3 continuously transmits it through the HS-DPCCH (sub-frame) to the base station 1 by use of an HARQ-ACK information transmission time slot (in this example, a free slot in a case in which no HARQ-ACK information to be transmitted exists) (step S7).

That is, the base station 1 extracts the aforesaid HS-SCCH best-sensitivity code number information, transmitted from the mobile station 3, from the HS-DPCCH sub-frame (10 ms) through the use of the antenna reception radio processing unit 46, the HS-DPCCH code correlation arithmetic operation unit 19, the HS-DPCCH propagation path correction/rake combination unit 22 and the HS-SCCH reception information pattern correlation judging unit 23 so as to recognize (determine) the HS-SCCH code at which the mobile station 3 receives the directional multibeam with the highest sensitivity (step S8). Following this, the base station 1 adds the user data (HS-DPCH transmission information) to the HS-SCCH of the determined HS-SCCH code and transmits it to the mobile station 3 (step S9) and then transmits, to the mobile station 3, the user data from the RNC 5 through the HS-DSCH in a state transmitted by two slots (step S10).

Thereafter, as long as the base station 1 receives user data addressed to the mobile station 3 from the RNC 5, likewise, the base station 1 transmits the user data to the mobile station 3 through the use of the HS-SCCH and the HS-DSCH (steps S12, S13, S15 and S16). In the meantime, the mobile station 3 advertises the reception success/failure on the aforesaid user data to the base station 1 by means of the HARQ-ACK information and transmits the CQI information to the base station 1 (steps S11, S14 and S17). The base station 1 executes the retransmission control as needed according to the received HARQ-ACK information and implements the control to adaptively switch the modulation mode according to the received CQI information (step S18).

When the download of the user data is completed, the mobile station 3 advertises this fact through the base station 1 to the RNC 5 and terminates the processing (step S19).

Following this, the reception environment varies in accordance with the movement of the mobile station 3, and the mobile station 3 repeatedly carries out the processing in the above-mentioned steps S3 to S19 upon a download request being occurred and until the download is completed.

As described above, according to this embodiment, the HS-SCCH directional multibeam where a different HS-SCCH code is allocated to each beam is transmitted from the base station 1, and the mobile station 3 makes a judgment on a directional beam with an HS-SCCH code which provides a satisfactory reception condition and has the highest autocorrelation of the autocorrelations of the respective beams and selects it and further advertises (feedbacks) this code information (HS-SCCH best-sensitivity code number information) through the uplink HS-DPCCH to the base station 1. Thus, the base station 1 can allocate an HS-SCCH code which provides the best reception condition to the mobile station 3.

In specifically, according to this embodiment, for the feedback of the above-mentioned code information, unlike the previous technique, an HARQ-ACK information transmission time slot of an HS-DPCCH sub-frame (2 ms) is employed without using an information symbol which allows the recognition of the information contents only when two or more radio frames (each 10 ms) are taken to carry out the demodulation and decoding processing, so it is possible to, in comparison with the previous technique, greatly shorten the time taken until the recognition of an HS-SCCH code which provides the highest autocorrelation and the best reception condition in the mobile station 3.

In consequence, with respect to the HS-SCCH which always requires the demodulation processing prior to the reception of high-speed packet data (user data) through the HS-DSCH, it is possible to greatly increase the speed of the loop control between the base station 1 and the mobile station 3 which adaptively allocates the HS-SCCH having the best reception condition to the mobile station 3, thereby considerably improving the throughput of the HS-DSCH.

In addition, since the HS-SCCH code to be transmitted for each directional beam is set as one kind (single code), it is possible to reduce the ratio of the transmission power for the HS-SCCH code with respect to the total transmission power for the same beam, which allows the power corresponding to this reduction to be distributed to the HS-DSCH for the transmission of high-speed packet data, so the great improvement of the throughput is expectable.

(2) Operation Example 2 (FIG. 8)

Furthermore, as an operation example 2, with reference to FIG. 8, a description will be given hereinbelow of a case in which the HARQ-ACK information and the HS-SCCH best-sensitivity code number information are transmitted from the mobile station 3 to the base station 1 in a state superimposed on each other and the mobile station 3 moves while receiving user data (high-speed packet data) so that the reception environment varies.

Also in this case, as well as the operation described above with reference to FIG. 7, when an HSDPA setup request is transmitted from the RNC 5 to the base station (NodeB) 1 (step S1), the base station 1 transmits HS-SCCH directional multibeam, where a different HS-SCCH code is allocated to each beam, through the use of the HS-SCCH symbol data generating unit 14, the HS-SCCH code spread processing unit 15, the HS-SCCH transmission weight complex multiplication unit 16 and the antenna transmission radio processing unit 17 (step S2).

In this state, when the mobile station (UE: User Equipment) 3 makes a request for the download of HSDPA user data to the base station 1, this download request is transmitted through the base station 1 to the RNC 5 (step S3), and the RNC 5 transmits a request for the acceptance of the HSDPA user data (high-speed packet data) (step S4). The base station 1 returns an answer (OK or NG) to this acceptance to the RNC 5 (step S5) and, if this answer indicates OK, the RNC 5 transmits a user data acceptance advertisement through the base station 1 to the mobile station 3 (step S6).

Upon receipt of the aforesaid user data acceptance advertisement, the mobile station 3 starts to shift to the HSDPA and generates CQI information through the use of the pilot signal correlation arithmetic operation unit 38 and transmits it through the HS-DPCCH by means of the HS-DPCCH symbol data transmission processing unit 42, the HS-DPCCH code spread processing unit 43, the uplink signal complex spread processing unit 45 and the antenna transmission radio processing unit 46. At this time, the mobile station 2 selects and determines the HS-SCCH best-sensitivity code number information indicative of the maximum reception power of the HS-SCCH directional multibeam from the base station 1 by means of the HS-SCCH code correlation arithmetic operation unit 35, the HS-SCCH propagation path correction/rake combination unit 36, the HS-SCCH reception power best-judgment/maximum value detection unit 40 and the HS-SCCH code information symbol pattern processing unit 41. The mobile station 3 continuously it through the HS-DPCCH to the base station 1 by use of an HARQ-ACK information transmission time slot (step S7).

That is, the base station 1 extracts the aforesaid HS-SCCH best-sensitivity code number information from the mobile station 3 through the use of the antenna reception radio processing unit 46, the HS-DPCCH code correlation arithmetic operation unit 19, the HS-DPCCH propagation path correction/rake combination unit 22 and the HS-SCCH reception information pattern correlation judging unit 23 so as to recognize (determine) the HS-SCCH code at which the mobile station 3 receives the directional multibeam with the highest sensitivity (step S8). Following this, the base station 1 advertises, to the mobile station 3, the transmission of the user data through the HS-SCCH of the HS-SCCH code to the mobile station 3 (step S9) and then transmits the user data from the RNC 5 through the HS-DSCH to the mobile station 3, by two slots late (step S10).

Thereafter, as long as the base station 1 receives user data addressed to the mobile station 3 from the RNC 5, likewise, the base station 1 transmits the user data to the mobile station 3 through the use of the HS-SCCH and the HS-DSCH (steps S12, S13, S15 and S16). In the meantime, the mobile station 3 superimposes the HS-SCCH best-sensitivity code number information on the HARQ-ACK information and continuously advertises it to the base station 1 as mentioned above with reference to FIGS. 5 and 6 and transmits the CQI information to the base station 1 (steps S11a, S14a and S17a). Meanwhile, in a case in which the mobile station 3 moves during the data download so that the reception environment varies so as to change the HS-SCCH best-sensitivity code number information, the mobile station 3 superimposes the changed HS-SCCH best-sensitivity code number information on the aforesaid HARQ-ACK information.

The base station 1 extracts the HS-SCCH best-sensitivity code number information from the received HARQ-ACK information as mentioned above with reference to FIG. 6 and extracts the ACK/NACK information (step S18a) and adaptively switches the HS-SCCH code on the basis of the extracted HS-SCCH best-sensitivity code number information (step S18b) and further executes the needed retransmission control according to the extracted ACK/NACK information. Moreover, it adaptively switches the modulation mode according to the received CQI information (step S18).

When the download of the user data reaches completion, the mobile station 3 advertises this fact through the base station 1 to the RNC 5 and terminates the processing (step S19).

Following this, the reception environment varies in accordance with the movement of the mobile station 3, and the mobile station 3 again carries out the processing in the above-mentioned steps S3 to S18, S18a, S18b and S19 whenever a download request takes place and until the download reaches completion.

As described above, this example can provide the effects and advantages similar to those of the above-described operation example 1 and, since the mobile station 3 can feedback the HS-SCCH best-sensitivity code number information to the base station 1 in a state superimposed (multiplied) on the HARQ-ACK information of the HS-DPCCH sub-frame, it further enables the HS-SCCH best-sensitivity code number information to be continuously (successively) without making a judgment as to the presence or absence of vacancy of a transmission time slot of the HARQ-ACK information of the HS-DPCCH sub-frame (presence or absence of HARQ-ACK information to be transmitted). This leads to the further improvement of the recognition performance on the HS-SCCH best-sensitivity code number information and the speed-up of the aforesaid loop control in the base station 1.

[B] Others

The present invention is not limited to the above-described embodiment, and that it is intended to cover all changes and modifications of the embodiment of the invention herein which do not constitute departures from the spirit and scope of the invention.

For example, although in the above-described embodiment the downlink physical channel and the uplink physical channel between the radio base-station apparatus and the radio terminal apparatus are respectively the HS-SCCH and the HS-DPCCH on the assumption of the HSDPA technique, a physical channel for use in loop control such as TPC (Transmission Power Control) in a radio access technique such as CDMA which does not employ the HSDPA technique is also applicable in like manner, and the effects and advantages similar to those of the above-described embodiment are expectable.

INDUSTRIAL APPLICABILITY

According to the present invention, with respect to the directional multibeam along a downlink physical channel to a radio terminal, identification information on an orthogonal code series having the best reception condition is advertised to a radio base station through an uplink physical channel, which enables the time to be taken for the recognition of the orthogonal code series having a satisfactory reception condition to be greatly shortened in comparison with a previous technique. In consequence, it is possible to greatly increase the speed of the loop control between the radio base station and the radio terminal which adaptively allocates an orthogonal code series with the best reception condition to the radio terminal, which in turn leads to considerably improving the throughput of a channel used to transmit user data, so it can be considered that the present invention is extremely useful in the field of radio communications.

What is claimed is:

1. A radio access method for use in a radio system including a radio terminal and a radio base station having an array antenna with a plurality of antenna elements and capable of transmitting directional multibeam from said array antenna of said radio base station to said radio terminal in a state where a different orthogonal code series is allocated to each of a plurality of directional beams, said radio access method comprising:
on the radio base station,
transmitting a directional multibeam of a downlink physical channel to said radio terminal,
on said radio terminal,
receiving the directional multibeam from said radio base station;
obtaining correlation between the orthogonal code series of the received directional multibeam and an orthogonal code series stored in said radio terminal;
determining an orthogonal code series having a highest correlation; and
transmitting orthogonal code series identification information identifying the determined orthogonal code series to said radio base station by superimposing the orthogonal code series identification information on information used for retransmission control between said radio base station and said radio terminal.

2. The radio access method according to claim 1, wherein the downlink physical channel is an HS-SCCH (High Speed-Shared Control Channel) of an HSDPA (High Speed Downlink Packet Access) system, and
said radio terminal transmits the orthogonal code series identification information to said radio base station through an HS-DPCCH (High Speed-Dedicated Physical Control Channel) of the HSDPA system.

3. The radio access method according to claim 2, wherein said radio terminal transmits the orthogonal code series identification information to said radio base station at a transmission timing of an HARQ (Hybrid Automatic Repeat reQuest)-ACK symbol in the HS-DPCCH.

4. The radio access method according to claim 3, wherein said radio terminal transmits the orthogonal code series identification information to said radio base station by superimposing the orthogonal code series identification information on the HARQ-ACK symbol.

5. The radio access method according to claim 1, wherein said radio base station determines an orthogonal code series for the downlink physical channel to said radio terminal based on the orthogonal code series identification information received from said radio terminal.

6. The radio access method according to claim 1, wherein the same orthogonal code series is shared between said radio base station and a plurality of the radio terminals, and a plurality of orthogonal code series to be transmitted through a plurality of directional beams at the same time are identified by the individual directional beams.

7. The radio access method according to claim 1, wherein, with respect to directional multibeam to be transmitted from said radio base station or another radio base station, different orthogonal code series are allocated among directional beams adjacent to each other.

8. The radio access method according to claim 1, wherein said radio base station allocates a single code as the orthogonal code series for each directional beam of the directional multibeam.

9. A radio base station, which is for use in a radio system including a radio terminal and a radio base station having an array antenna with a plurality of antenna elements and capable of transmitting directional multibeam from said array antenna of said radio base station to said radio terminal in a state where a different orthogonal code series is allocated to each of a plurality of directional beams, said radio base station comprising:
a transmitting unit that transmits directional multibeam of a downlink physical channel to said radio terminal;
a receiving unit that receives orthogonal code series identification information, transmitted from said radio terminal, identifying an orthogonal code series determined as having a high autocorrelation out of the directional multibeam transmitted from said transmitting unit, the orthogonal code series identification information is superimposed on information used for retransmission control between said radio base station and said radio terminal; and a determination unit that determines an orthogonal code series for the downlink physical channel to said radio terminal based on the orthogonal code series identification information received by said receiving unit.

10. The radio base station according to claim 9, wherein said transmitting unit allocates a single code as the orthogonal code series for each directional beam of the directional multibeam.

11. The radio base station according to claim 9, wherein said transmitting unit includes an HS-SCCH transmission processing unit that transmits the directional multibeam through an HS-SCCH (High Speed-Shared Control Channel) of an HSDPA (High Speed Downlink Packet Access) system.

12. A radio terminal, which is for use in a radio system including a radio terminal and a radio base station having an array antenna with a plurality of antenna elements and capable of transmitting directional multibeam from said array antenna of said radio base station to said radio terminal in a state where a different orthogonal code series is allocated to each of a plurality of directional beams, said radio terminal comprising:

a receiving unit that receives directional multibeam of downlink physical channel from said radio base station;

a correlation determination unit that obtains each of correlation between the orthogonal code series of the directional multibeam received by said receiving unit and orthogonal code series stored in said radio terminal, and determining an orthogonal code series having the highest autocorrelation; and a transmitting unit that transmits orthogonal code series identification information identifying the orthogonal code series determined by said correlation determination unit, to said radio base station by superimposing the orthogonal code series identification information on information used for retransmission control between said radio base station and said radio terminal.

13. The radio terminal according to claim 12, wherein said transmitting unit includes an HS-DPCCH transmission processing unit that transmits the orthogonal code series identification information to said radio base station through an HS-DPCCH (High Speed-Dedicated Physical Control Channel) of an HSDPA (High Speed Downlink Packet Access) system.

14. The radio terminal according to claim 13, wherein said HS-DPCCH transmission processing unit transmits the orthogonal code series identification information to said radio base station at a transmission timing of an HARQ (Hybrid Automatic Repeat reQuest)-ACK symbol in the HS-DPCCH.

15. The radio terminal according to claim 14, wherein said HS-DPCCH transmission processing unit transmits the orthogonal code series identification information to said radio base station in a state superimposed on the HARQ-ACK symbol.

* * * * *